United States Patent [19]

Podgers

[11] Patent Number: 4,919,305

[45] Date of Patent: Apr. 24, 1990

[54] FUEL DISPENSING NOZZLE WITH BUILT-IN FLOW REGULATOR

[75] Inventor: Alexander R. Podgers, Lake City, Pa.

[73] Assignee: Emco Wheaton, Inc., Raleigh, N.C.

[21] Appl. No.: 333,860

[22] Filed: Apr. 4, 1989

Related U.S. Application Data

[63] Continuation of Ser. No. 117,338, Nov. 6, 1987, abandoned.

[51] Int. Cl.⁵ .......................... B67D 5/08; B67D 5/16
[52] U.S. Cl. ......................................... 222/55; 222/59; 222/73; 222/544; 137/501; 137/614.19

[56] References Cited

U.S. PATENT DOCUMENTS

| | | | |
|---|---|---|---|
| 1,860,046 | 5/1932 | McCutcheon | 137/614.19 X |
| 2,732,100 | 1/1956 | Jackson et al. | 222/73 |
| 3,088,500 | 5/1963 | Payne | 141/209 X |
| 4,275,764 | 6/1981 | Baret | 137/614.19 |
| 4,537,219 | 8/1985 | Milish | 137/614.19 |

FOREIGN PATENT DOCUMENTS 2900835   8/1979   Fed. Rep. of Germany ...... 137/501

Primary Examiner—Joseph J. Rolla
Assistant Examiner—Steven M. Reiss
Attorney, Agent, or Firm—Pearne, Gordon, McCoy & Granger

[57] ABSTRACT

A fuel dispensing nozzle for refueling vehicles is disclosed. The nozzle provides a poppet valve for manually controlling the flow rate through the nozzle and an automatic flow control regulator for limiting the maximum flow rate through the nozzle to a predetermined maximum flow rate. The illustrated embodiment provides the automatic flow regulator in an existing passage within the nozzle body downstream from the poppet valve. Therefore, the regulator can be retrofitted into existing nozzles without separate fasteners or the like. The regulator includes a polymeric sleeve having lateral ports and a piston slidable in the sleeve providing an orifice around the operating rod of the poppet valve. A spring normally maintains the piston in its full open position. When flow rates approach the maximum desired predetermined flow rate, a pressure drop occurs through the orifice, producing a force overcoming the spring and causing the piston to move down and partially cover the ports in the sleeve. This results in throttling of the flow through the nozzle and limits the flow to rates below the predetermined maximum desired flow rate.

7 Claims, 3 Drawing Sheets

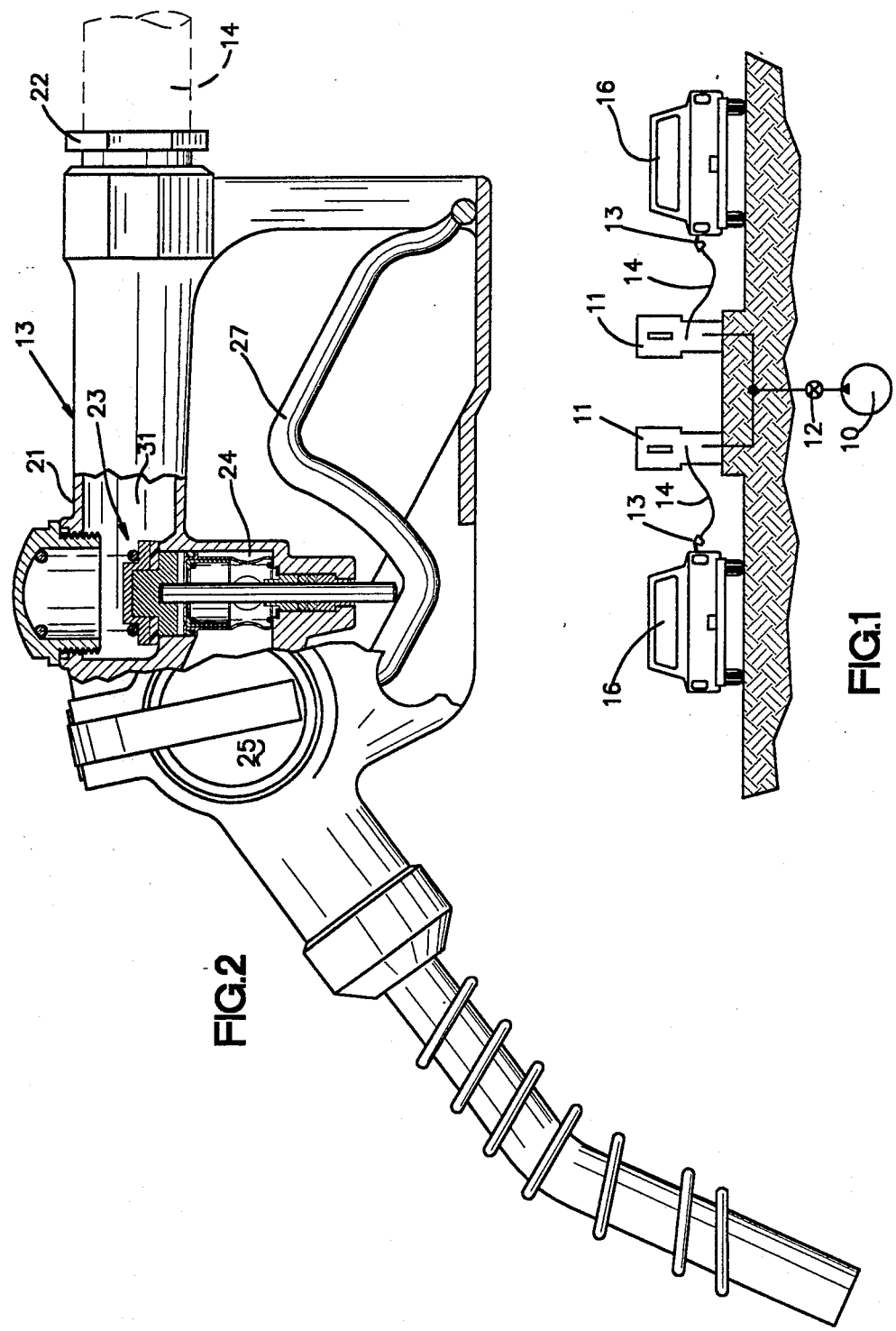

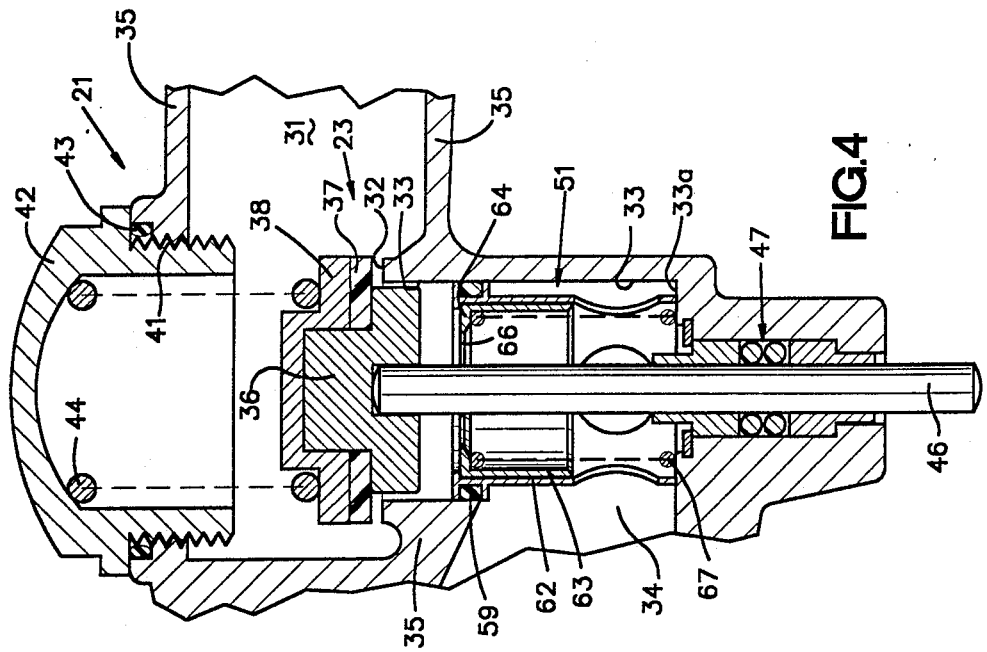
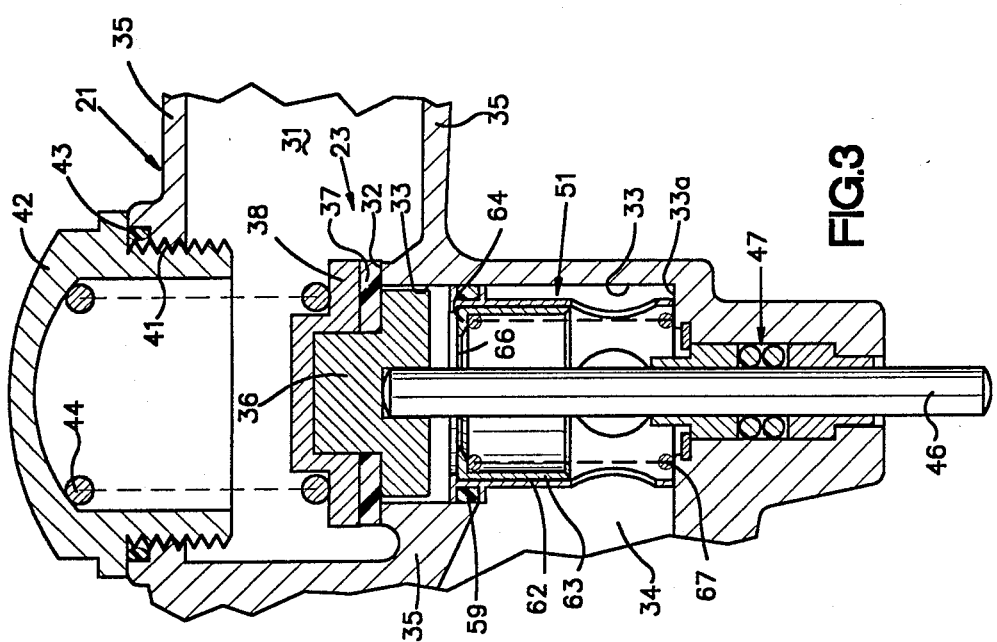

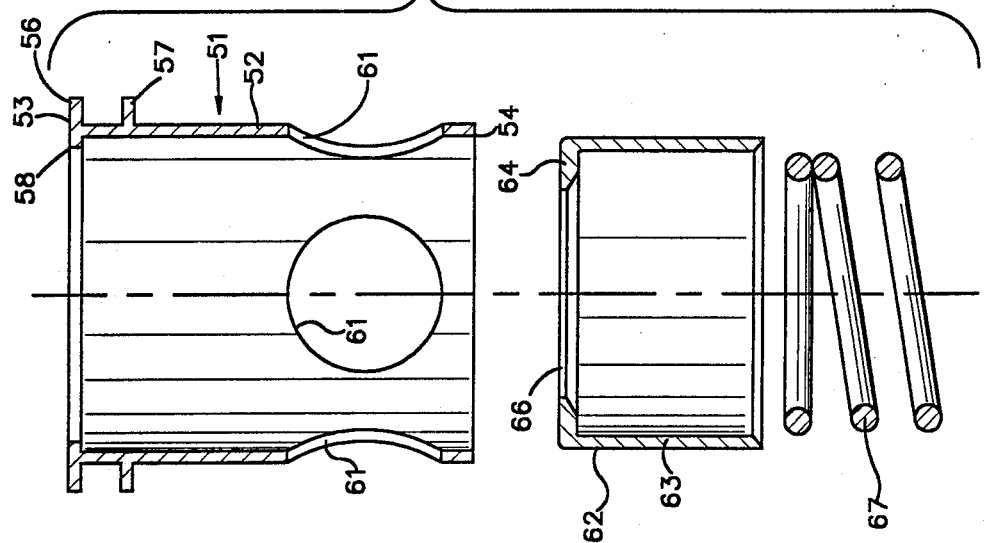
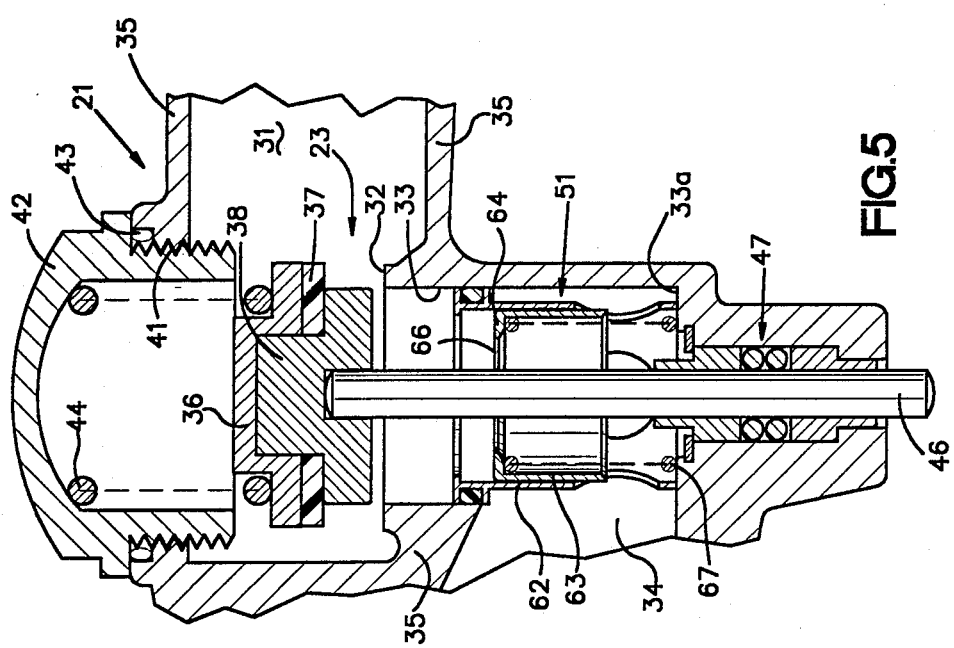
FIG.6
FIG.5

FUEL DISPENSING NOZZLE WITH BUILT-IN FLOW REGULATOR

This is a continuation of application Ser. No. 117,338, filed Nov. 6, 1987, now abandoned.

BACKGROUND OF THE INVENTION

This invention relates generally to fuel dispensing nozzles, and more particularly to a novel and improved fuel dispensing nozzle incorporating an automatic flow regulator operable to limit flow rates through the nozzle to a predetermined maximum flow rate.

Prior Art

Federal government agencies have concluded that fuel spills can be significantly reduced and, in most instances, virtually eliminated if the maximum fuel flow rate in the refueling of noncommercial vehicles is appropriately limited.

If the fuel is dispensed at a rate greater than the rate the vapor can be displaced from the vehicle fuel system, back pressure builds up, causing premature shutoff of the fuel nozzle and the possibility of fuel spitback. Further, the capacity of the on-board vapor recovery system of the vehicle is exceeded if the fueling rates are excessive.

Older and smaller service stations tend to use a suction pump which is located inside the individual dispenser. These suction pump dispensers normally operate at relatively low flow rates. However, newer, higher volume facilities use submersible turbine pumps which are located away from the dispenser and are either on or in the underground storage tank. They serve all of the dispensers and nozzles drawing fuel from the associated tank. Thus, the actual flow rate varies, depending upon the number of nozzles being operated from one pump. The submersible pumps are of higher horsepower and are capable, in many instances, of dispensing fuel at excessive rates, tending to cause spills and spitback.

In order to minimize pollution resulting from fueling spills and the like, it is desirable to provide a fueling system in which the fueling rate from a given nozzle is limited to a standardized maximum flow rate, and for vehicle producers to structure the vehicle fuel system and the on-board vapor recovery system to have the capacity to properly receive the fuel at such maximum rate. One suggested maximum flow rate is ten gallons per minute.

It is known to provide a separate automatic flow regulator in the flow conduit ahead of a nozzle to control the maximum fuel flow rate through the associated nozzle. However, such regulators tend to be relatively expensive and require additional connections which are a source of possible leaks. Further such separate regulators are often removed from the system by the station operators.

SUMMARY OF THE INVENTION

The present invention provides a novel and improved flow dispensing nozzle incorporating within the nozzle itself an automatic flow regulator which operates to prevent flow rates in excess of predetermined maximum values. Such flow regulators are economical and can be retrofitted into many existing nozzles, as well as being supplied in new nozzles. The illustrated embodiment requires only three significant parts: two molded polymeric parts and a single compression spring. Further, the regulator does not require any special structure within the basic nozzle construction.

In the illustrated embodiment, the nozzle provides a manually operable poppet valve through which the fuel flows when the poppet valve is opened by the user. If the poppet valve is opened a small amount, the flow rate of fuel through the nozzle is determined by the degree of opening of the poppet valve.

Positioned immediately downstream from the poppet valve is an automatic flow regulator providing a sleeve having lateral openings or ports therein. Positioned within the sleeve is a piston biased in one direction by a compression spring. The operating rod for the poppet valve extends through the sleeve and the piston. The low flow control actuator may also extend through the piston.

The piston and the poppet valve operating rod cooperate to define an annular orifice therebetween. When the pressure, and thus flow rates, are low, the spring maintains the piston in the position in which it does not cover the lateral ports in the sleeve and the flow through the nozzle is established by the poppet valve. However, when the poppet valve is moved to or approaches a fully open position or the pressure is raised and would allow excessive flow rates of fuel, the pressure differential increases across the orifice in the piston and the piston is moved by such pressure differential resultant force against the action of the spring. The piston moves to a position in which the skirt of the piston partially covers the lateral side ports in the sleeve to reduce the flow area and thus limit the fuel flow rate.

The size of the orifice and the force exerted by the spring determine the flow rate which will be permitted by the regulator. If, for example, the desired maximum fuel flow rate is ten gallons per minute, the regulator is calibrated to limit the flow rate to values not exceeding ten gallons per minute.

With the present invention, a simple, low-cost regulator is incorporated into each nozzle. Such regulator automatically limits the flow rate through the nozzle to a predetermined value and minimizes or eliminates fuel spills. The regulator is positioned within a previously existing nozzle passage, and therefore does not require any special nozzle structure. In fact, the illustrated regulator can be retrofitted in many existing nozzles.

Because the regulator is located within a previously existing nozzle passage, additional external connections are not required. Therefore, the provision of the regulator does not increase the number of external connections and does not increase the number of possible leakage paths.

These and other aspects of this invention are illustrated in the accompanying drawings, and are more fully described in the following specification.

BRIEF DESCRIPTION OF THE DRAWINGS

FIG. 1 is a schematic illustration of a vehicle fueling system to which the present invention is particularly applicable;

FIG. 2 is a side elevation, partially in section, of a typical automatic shutoff nozzle incorporating a flow regulator in accordance with the present invention;

FIG. 3 is an enlarged, fragmentary section, illustrating the structural detail of a poppet valve and flow regulator combination in accordance with the present invention when the poppet valve is closed, thereby preventing flow;

FIG. 4 is an enlarged, fragmentary section, similar to FIG. 3 but illustrating the positions of the elements when the poppet valve is opened a small amount and does not cause sufficient flow rates to produce flow limiting operation of the regulator;

FIG. 5 is a fragmentary view similar to FIG. 4 but illustrating the poppet in the full opened position and the regulator operating to limit the rate of fuel flow through the nozzle; and FIG. 6 is an exploded view of the three principal components of the flow regulator in accordance with this invention.

DETAILED DESCRIPTION OF THE DRAWINGS

FIG. 1 schematically illustrates an overall fueling system of the type to which the present invention is particularly suited. This system provides a fuel tank 10 for supplying fuel to two or more dispensers 11. A pump 12 is provided to pump the fuel out of the tank 10 and to supply fuel under pressure to each of the dispensers 11. Each dispenser is provided with a fuel dispensing nozzle 13 connected to the associated dispenser by a flexible hose 14.

Since the single pump 12 supplies fuel to more than one dispensing system, its capacity is normally selected so that a flow rate is available to adequately supply fuel under pressure simultaneously to all of the associated nozzles. Consequently, the capacity of the pump 12 is often sufficiently great to deliver an excessive amount of fuel to a given nozzle when only one nozzle is being supplied by the pump.

In accordance with the present invention, each of the nozzles 13 is provided with an automatic flow regulator connected in series with the manually operable valve of the nozzle so that the desired maximum flow rate will not be exceeded by any given nozzle under any operating conditions.

Therefore, if only one vehicle 16 is being fueled at a given time, the maximum flow rate is the maximum desired flow rate for the system. On the other hand, even when two or more vehicles are being fueled at a given time, the flow rate to each nozzle can approach the maximum flow rate mentioned above.

FIG. 2 schematically illustrates a typical fuel nozzle incorporating the present invention. Such nozzle includes a body 21 having an inlet 22 connected to the supply hose 14 and through which fuel enters the nozzle. Downstream from the inlet is a manually controllable poppet valve 23 operated by the user to control the fueling of a vehicle.

Downstream from the poppet valve 23 is an automatic flow regulator 24 through which the fuel must pass after passing through the poppet valve 23. Downstream from the flow regulator 24 is a typical automatic shutoff 25 (not specifically illustrated) for automatically shutting off the nozzle by closing the poppet valve 23 when fuel is sensed at the outlet or delivery end 26 of the nozzle.

The automatic shutoff apparatus of the nozzle usually functions to release a pivot for the user-operated handle 27 to cause the poppet valve 23 to automatically close whenever fuel reaches the outlet end 26 of the nozzle. Those skilled in the art are familiar with the structure and operation of automatic shutoff systems which are commonly used in the industry. The particular shutoff system forms no part of this invention except to the extent it is defined in the accompanying claims.

Reference should now be made to FIGS. 3 through 6, which illustrate the structural detail and mode of operation of the combination poppet valve and automatic flow regulator in accordance with the present invention.

The body 21 provides an inlet passage 31 through which the fuel from the inlet 22 (illustrated in FIG. 2) flows to the poppet valve 23. Located in the passage 31 is an annular valve seat 32 extending around a lateral passage 33 which is cylindrical and extends between the passage 31 and a downstream passage 34. At the inner end of the lateral passage 33 is a lateral wall 33a substantially perpendicular to and aligned with the lateral passage 33. All of these passages 31, 33, and 34 are defined by integral walls 35 of the body, which is preferably a cast or molded metallic member.

Positioned within the lateral passage 33 is a poppet valve assembly including a poppet head 36, an elastomeric seal ring 37, and a cap member 38. The poppet head 36 extends down into the passage 33 and is laterally positioned thereby while being axially movable therealong.

Coaxial with the lateral passage 33 is a threaded opening 41 in the wall 35 of the body 21. A cap 42 is threaded into the opening 41 and provides a fluidtight joint therewith by means of an O-ring type seal 43. Extending between the cap 42 and the cap member 38 of the poppet assembly is a compression spring 44. This spring normally maintains the poppet valve 23 closed (as illustrated in FIG. 3) in a position in which the elastomeric seal ring 37 engages the valve seat 32 to prevent flow from the passage 31 into the lateral passage 33. However, when the handle 27 (illustrated in FIG. 2) is operated, it raises an operating rod 46 which extends through the lateral wall 33a into the poppet head 36 at its upper end and causes the poppet head to be raised with respect to the valve seat 32 against the action of the spring 44. This, in turn, lifts the elastic seal ring 37 away from the valve seat and opens the poppet valve, allowing fuel flow from the passage 31 along the passage 33 into the passage 34.

The lower end of the operating rod 46 extends through a seal assembly 47 to prevent leakage along the rod of the nozzle.

The structure thus far described is conventional and has been marketed by the assignee of the present invention for a considerable period of time, and constitutes prior art with respect to the present invention. However, in such nozzles, there is no automatic flow regulator 24 and the maximum flow rate through the nozzle is solely a function of the pressure of the fuel being supplied to the nozzle and the general configuration and size of the various components of the nozzle itself. In many installations, such nozzles function, when the poppet valves are fully opened, to dispense fuel at a relatively high rate.

In some installations, the rate at which the fuel can be dispensed through the nozzle is sufficiently high to cause premature shutoff of the nozzle by the automatic shutoff mechanism, and often results in a spitback which results in a fuel spill, which can soil the customer's clothing and produce pollution and fuel loss. Further, premature shutoffs are annoying to customers and often lead them to mistakenly believe that the vehicle fuel tank is full when in fact it is not.

In accordance with the present invention, the automatic flow regulator 24 is provided at the junction between the lateral passage 33 and the downstream passage 34. This regulator automatically functions to limit the maximum flow rate of fuel through the nozzle and avoids premature shutoff and other fuel spilling problems.

The automatic regulator 24 includes a sleeve member 51 having a cylindrical portion 52 extending from an upper end 53 to a lower end 54. Adjacent to the upper end, the sleeve provides spaced first and second external annular flanges 56 and 57, respectively. In addition, an inwardly extending lip 58 is provided at the upper end 53 of the sleeve.

The two flanges 56 and 57 are sized to closely fit the interior of the lateral passage 33, as best illustrated in FIGS. 3 through 5, and cooperate to receive an O-ring seal 59 therebetween. This seal provides a fluidtight joint between the sleeve and the lateral passage so that fuel flowing through the nozzle must pass through the sleeve 51. The seal 59 also holds the sleeve secure by means of friction against the body.

The sleeve 51 is also provided with a plurality of openings 61 peripherally spaced around the cylindrical portion at a location spaced axially from the upper end 53 of the sleeve. These openings provide substantial communication between the interior of the sleeve and the downstream passage 34.

Positioned within the sleeve is an orifice piston 62 having a skirt portion 63 which closely fits the inner wall of the cylindrical portion 52 of the sleeve 51. The piston 62 moves freely in the sleeve. The piston 62 is also provided with an inturned flange 64 at its upper end which defines an orifice 66 through which the fuel passing through the nozzle must flow. This orifice 66 is defined externally by the inturned flange 64 and internally by the operating rod 46. Consequently, the orifice 66 itself is an annular orifice extending around the operating rod 46.

A spring 67 extends up along the sleeve 51 and engages the inturned flange 64 of the piston at its upper end. This spring normally functions to maintain the piston 62 in the uppermost position in engagement with the lip 58, as illustrated in FIG. 4. In such position, the skirt 63 of the piston is above the opening 61 and full free flow of fuel is provided through the automatic flow regulator 24.

When the poppet valve is opened a small amount, as illustrated in FIG. 4, the spring 67 exerts sufficient force on the piston to overcome any pressure differential acting on the inturned flange 64 as a result of the flow through the orifice 66 and the regulator remains in its fully opened position. However, as the flow increases through the nozzle when the poppet valve is opened greater and greater amounts, or when the flowing pressure is increased at a given stroke, a pressure drop occurs through the orifice 66 which produces a downward force on the piston. This downward force is a function of the upstream pressure.

When sufficiently high pressure occurs, the pressure drop increases to a value sufficiently high to cause the piston to move downwardly against the action of the spring 67 to partially close the ports or openings 61 and restrict the flow of fuel through the nozzle. The size of the orifice and the force provided by the spring are selected so that the piston limits flow through the nozzle to a desired maximum predetermined rate, e.g., ten gallons per minute. Therefore, if the pump supplying the pressure fluid to the nozzle produces sufficient pressure to otherwise cause excessive flow rates through the nozzle, the automatic flow regulator operates to prevent such excessive flow rates.

The sleeve 51 is retained by friction to the body by the O-ring seal 59 and is butted against the adjacent lateral wall 33a. If, because of the force of the spring, a small space opens up between the sleeve and the lateral wall, it will be closed in operation since the piston 62 moves down against the action of the spring and the spring force is isolated from the sleeve. In such instance, the pressure drop through the sleeve orifice 58 produces a downward force on the sleeve 51, causing it to tightly engage the adjacent body wall 33a, as indicated in FIG. 5. Therefore, during regulation, substantially all of the flow must pass through the port openings 61 where the flow rate is controlled by the piston 62. Thus, the controlled flow rate error is minimized over a broad range of pressures.

It should be noted that the automatic flow regulator requires only three significant parts plus an O-ring seal. These parts can be produced and installed at very low cost and provide reliable functions. In fact, the sleeve and piston are preferably molded polymeric parts which can be produced at very low cost. Further, the flow regulator can be retrofitted in existing nozzles, and is assembled along with the poppet through the opening 41 in the nozzle body. Still further, the provision of a flow regulating valve within the nozzle does not require any modification of the nozzle proper, and therefore does not increase the overall nozzle cost. Still further, because the flow regulating valve is located within an existing passage within the nozzle, it does not require a separate body element, nor does it require any additional connections which could result in leakage problems.

Although the preferred embodiment of this invention has been shown and described, it should be understood that various modifications and rearrangements of the parts may be resorted to without departing from the scope of the invention as disclosed and claimed herein.

What is claimed is:

1. A fuel nozzle comprising a housing having a passage therethrough from an inlet to a nozzle outlet, said passage providing a first passage portion defined by a cylindrical wall open to a lateral second passage portion, a lateral wall substantially perpendicular to said cylindrical wall and aligned therewith, an open-ended sleeve providing a cylindrical wall portion having port openings therein, a seal providing a fluidtight joint between said sleeve and said cylindrical wall of said first passage, one end of said sleeve being engageable with and closed by said lateral wall, a piston in said sleeve movable between a first position substantially clear of said port openings to operative positions in which it covers portions of said port openings and throttles flow of fuel therethrough, a spring between said lateral wall and said piston resiliently urging said piston toward said first position, and an orifice through which fuel flows operating to produce a pressure differential across said piston causing said piston to move against the force of said spring and limit the flow of fuel through said nozzle to a predetermined maximum flow rate.

2. A fuel nozzle as set forth in claim 1, wherein said piston provides said orifice.

3. A fuel nozzle as set forth in claim 2, wherein said nozzle provides a manual valve having an operating rod extending through said sleeve, piston, and spring.

4. A fuel nozzle as set forth in claim 3, wherein said sleeve and piston are molded polymeric members.

5. A fuel dispensing nozzle for refueling vehicles, comprising
   a nozzle housing assembly providing a flow passage between a nozzle inlet and a nozzle outlet,
   a manual valve in said flow passage manually operable to control the rate of fuel flow through said passage, said manual valve providing an operating rod, and
   an automatic flow regulating valve in said passage operating to limit the flow of fuel through said passage to a predetermined maximum flow rate, said regulating valve being located within said passage without increasing the number of external connections in said nozzle and so that the number of possible external leakage paths is not increased by the presence of said regulating valve in said nozzle, said flow regulating valve including
   a sleeve having lateral ports therein,
   a piston providing a valving portion movable to positions partially closing said ports and throttling flow therethrough, and
   a spring resiliently biasing said piston in a direction clear of said ports, said piston providing an orifice through which said fuel flows, said fuel producing a force opposing said spring which is a direct function of the upstream pressure and flow rate of said fuel through said orifice, said operating rod extending through said orifice.

6. A fuel dispensing nozzle as set forth in claim 5, wherein said flow regulating valve is located downstream from said manual valve.

7. A fuel dispensing nozzle as set forth in claim 6, wherein said flow regulating valve is structured for installation in existing fuel nozzles without requiring modification thereof.

* * * * *